United States Patent
Met et al.

(10) Patent No.: US 9,596,873 B2
(45) Date of Patent: Mar. 21, 2017

(54) REFRIGERATOR COMPRISING A VACUUM COMPARTMENT

(71) Applicant: ARCELIK ANONIM SIRKETI, Istanbul (TR)

(72) Inventors: Aylin Met, Istanbul (TR); Feyzi Alper Soysal, Istanbul (TR); Aydin Celik, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 0 days.

(21) Appl. No.: 14/782,595

(22) PCT Filed: Mar. 28, 2014

(86) PCT No.: PCT/EP2014/056260
§ 371 (c)(1),
(2) Date: Oct. 5, 2015

(87) PCT Pub. No.: WO2014/161777
PCT Pub. Date: Oct. 9, 2014

(65) Prior Publication Data
US 2016/0058040 A1   Mar. 3, 2016

(30) Foreign Application Priority Data

Apr. 5, 2013  (TR) .............................. a 2013 04148

(51) Int. Cl.
*A47B 96/04* (2006.01)
*A23L 1/025* (2006.01)
(Continued)

(52) U.S. Cl.
CPC ............ *A23L 1/0257* (2013.01); *A23B 4/015* (2013.01); *A23L 3/0155* (2013.01); *A23L 3/28* (2013.01);
(Continued)

(58) Field of Classification Search
CPC ........ A23L 1/0257; A23L 5/36; A23L 3/0155; A23L 3/28; F25D 23/00; F25D 27/005;
(Continued)

(56) References Cited

U.S. PATENT DOCUMENTS 2,425,816 A   8/1947  Maxson
4,006,260 A * 2/1977  Webb ....................... A23B 7/02
                                                        426/438
(Continued)

FOREIGN PATENT DOCUMENTS

CN   2704003 Y   6/2005
DE   4341469 A1  6/1995
(Continued)

OTHER PUBLICATIONS

International Search Report or PCT/EP2014/056260.
Written Opinion of the International Search Authority for PCT/EP2014/056260.

*Primary Examiner* — Hanh V Tran
(74) *Attorney, Agent, or Firm* — Kilpatrick Townsend & Stockton LLP

(57) ABSTRACT

A refrigerator is described (1) having at least one fresh food compartment (2) wherein foodstuffs to be cooled are placed, a vacuum compartment (3) situated in the fresh food compartment (2), wherein foodstuffs are placed for being stored without being deteriorated, a pump (4) that enables the air inside the vacuum compartment (3) to be evacuated, and at least one ultraviolet lamp (5) that is situated on the vacuum compartment (3) and that provides sterilization.

16 Claims, 2 Drawing Sheets

Figure 1:
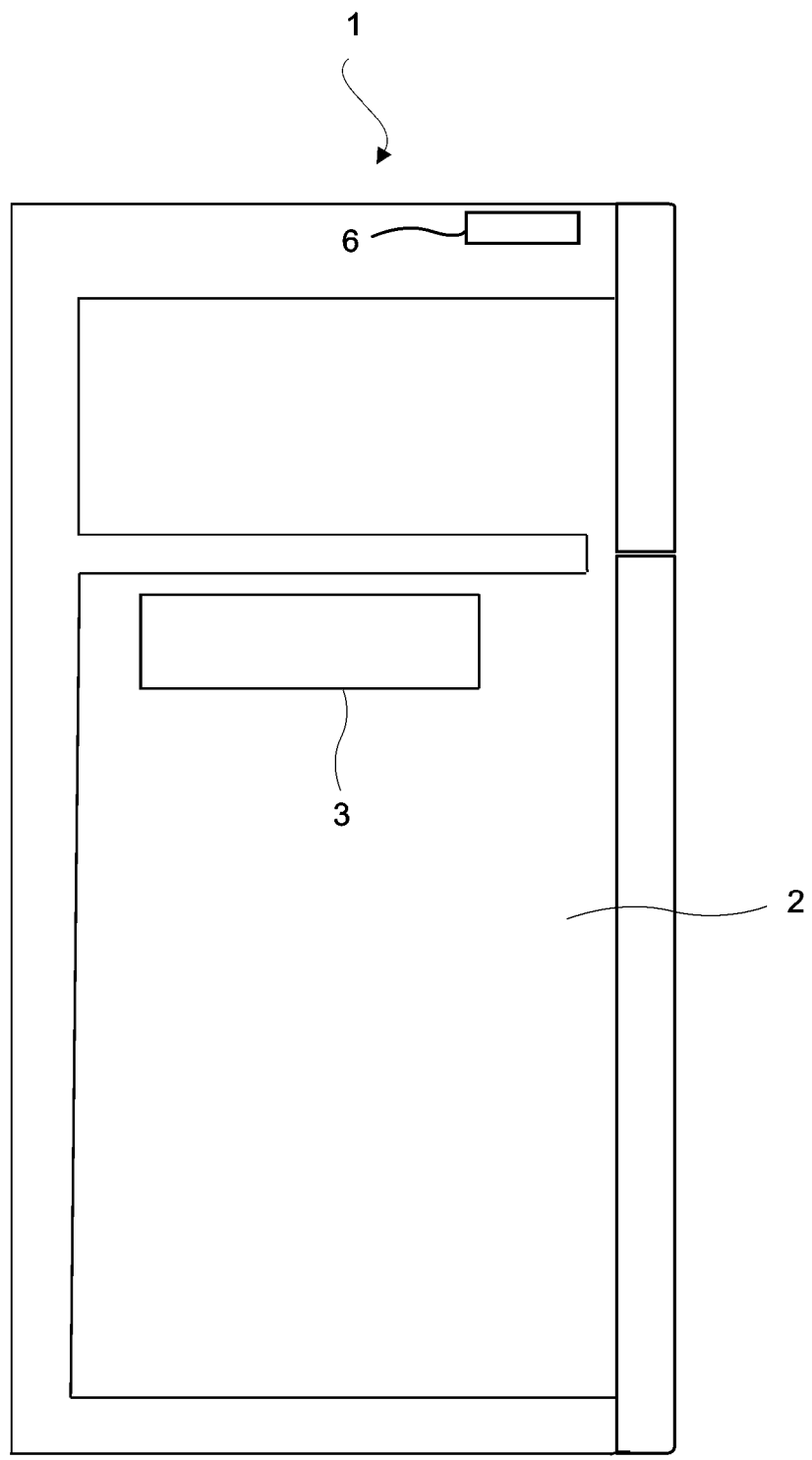

(51) Int. Cl.
*A23L 3/015* (2006.01)
*A23L 3/28* (2006.01)
*A23B 4/015* (2006.01)
*F25D 17/04* (2006.01)
*F25D 23/00* (2006.01)
*F25D 27/00* (2006.01)
*F25D 29/00* (2006.01)
*F25D 31/00* (2006.01)

(52) U.S. Cl.
CPC .............. *A23L 5/36* (2016.08); *F25D 17/042* (2013.01); *F25D 23/00* (2013.01); *F25D 27/005* (2013.01); *F25D 29/006* (2013.01); *F25D 31/00* (2013.01); *A23V 2002/00* (2013.01); *A23V 2300/31* (2013.01); *F25D 2300/00* (2013.01); *F25D 2317/043* (2013.01); *F25D 2317/0417* (2013.01); *F25D 2600/02* (2013.01)

(58) Field of Classification Search
CPC .... F25D 29/006; F25D 31/00; F25D 2600/02; F25D 2600/04; A23B 4/015; A23V 2300/12
See application file for complete search history.

(56) References Cited

U.S. PATENT DOCUMENTS

| | | | |
|---|---|---|---|
| 5,901,564 A | 5/1999 | Comeau, II | |
| 7,895,848 B2* | 3/2011 | Espinosa | A47F 3/001 62/100 |
| 8,387,405 B2 | 3/2013 | Johnson | |
| 2006/0117763 A1* | 6/2006 | Espinosa | A47F 3/001 62/78 |
| 2008/0302114 A1* | 12/2008 | Kelly | F25D 17/042 62/170 |
| 2012/0051030 A1* | 3/2012 | Johnson | F25D 17/042 362/92 |

FOREIGN PATENT DOCUMENTS

| | | |
|---|---|---|
| DE | 19858254 A1 | 6/2000 |
| DE | 102007021240 A1 | 11/2008 |
| JP | H10323384 A | 12/1998 |
| JP | 2004150763 A | 5/2004 |
| JP | 2004275330 A | 10/2004 |

* cited by examiner

REFRIGERATOR COMPRISING A VACUUM COMPARTMENT

The present invention relates to a refrigerator having a vacuum compartment that is placed into the fresh food compartment.

Vacuum compartments, that are situated in the fresh food compartment and wherein the oxygen concentration is decreased, are used in order to increase food storing time and to store foods that should be preserved at low temperatures such as meat, chicken, fish, etc. in the fresh food compartment. In the state of the art, the use of ultraviolet lamps, that decrease microbiological load of the air inside the vacuum compartment thus increasing the food storing time, in the vacuum compartment is known. While excessive decrease in the oxygen ratio inside the compartment during and after the vacuuming process leads to color changes in red meat such as darkening, greening, etc. that may cause the user to think that the food is decaying, the ultraviolet lamp cannot be used with high-intensity radiation due to high oxygen concentration and risk of high oxidation in environments wherein the vacuuming process is not performed.

In the state of the art Chinese Patent Application No. CN2704003, a refrigerator is disclosed, that comprises an ultraviolet lamp situated in the vacuum compartment, that provides energy saving and enables the foodstuffs to be stored for longer time periods.

The aim of the present invention is the realization of a refrigerator wherein foodstuffs are stored in a safe manner.

The refrigerator realized in order to attain the aim of the present invention, explicated in the first claim and the respective claims thereof, comprises at least one fresh food compartment wherein foodstuffs to be cooled are placed, a vacuum compartment situated in the fresh food compartment, wherein foodstuffs are placed for being stored without spoiling, a pump that enables the air inside the vacuum compartment to be evacuated and at least one ultraviolet lamp that is situated on the vacuum compartment and that provides sterilization. The refrigerator of the present invention comprises a control unit that enables the pump to be operated during a pump operation time predetermined by the producer for each type of food and enables the ultraviolet lamp to be operated during a sterilization time predetermined by the producer according to the pump operation time. The oxygen concentration inside the vacuum compartment depends on the pump operation time which differs according to food type. Thus, the radiation intensity of the ultraviolet lamp can be adjusted according to the oxygen concentration in the environment. In cases wherein the oxygen concentration inside the vacuum compartment is high, the ultraviolet lamp is operated for a longer time period. Thus, the pathogenic microorganisms and bacteria with the risk of growing due to the oxygen in the environment are prevented from being active and remaining alive.

In an embodiment of the present invention, the control unit activates the ultraviolet lamp while the pump is not operated. The ultraviolet lamp and the pump are never operated simultaneously. Since the ultraviolet light cannot be emitted in the vacuum compartment in a homogeneous and effective manner during the vacuuming process, the control unit activates the ultraviolet lamp before the pump. By applying the ultraviolet light before the vacuuming process, the microbiological load inside the vacuum compartment is decreased. Thus, the pump operation time is shortened and the amount of oxygen inside the vacuum compartment is prevented from falling below the concentration level that may cause color changes in foodstuffs such as red meat, etc.

In an embodiment of the present invention, the control unit operates the ultraviolet lamp for a predetermined sterilization time upper value if the pump operation time is greater than a pump operation time lower value predetermined by the producer or the user. For foodstuffs such as fish, chicken, etc. having short shelf life, the partial oxygen pressure inside the vacuum compartment should be low. Since the ultraviolet light triggers oxidation reaction in high oxygen concentrations, the ultraviolet lamp cannot be used for long time periods. Since the oxygen concentration is decreased by means of the vacuuming process, the ultraviolet intensity can be increased in a controlled manner, thus providing an effective food sterilization.

In an embodiment of the present invention, the refrigerator comprises at least one lid that is disposed on the vacuum compartment and that allows foodstuffs to be placed into the vacuum compartment. The control unit operates the ultraviolet lamp during the predetermined sterilization time when the lid is opened and closed. Thus, the microbiological load of the air that fills into the vacuum compartment is reduced before the vacuuming process starts, the foods are prevented from being spoiled and the color and taste of the foods are prevented from changing.

In an embodiment of the present invention, the ultraviolet lamp emits ultraviolet rays with wavelengths between 240 nm and 280 nm. The ultraviolet light consists of rays with wavelengths ranging from 210 nm to 328 nm. When the DNA of the microorganisms growing with the food and the oxygen in the compartment absorbs these rays, cell death occurs. The wavelength range between 240 nm and 280 nm is the ultraviolet ray range with the highest effect on microorganisms. By means of using the ultraviolet lamp that emits rays with wavelengths between 240 nm and 280 nm, effective sterilization is provided.

In an embodiment of the present invention, the sterilization and pump operation times predetermined by the producer vary depending on the type and weight of the foodstuffs and on the food thawing period.

In an embodiment of the present invention, the refrigerator comprises a button that is disposed on the vacuum compartment and that serves to start the vacuuming process. Thus, the vacuum compartment is enabled to be used under the control of the user.

In an embodiment of the present invention, the refrigerator comprises a display that shows the user that the vacuuming process is still being performed or completed. The information that the vacuuming process is still being performed and/or the vacuuming process is completed is displayed to the user by the display.

By means of the present invention, the foods are enabled to be hygienically stored with no change in the taste and/or the color thereof by means of the ultraviolet lamp operated during a predetermined sterilization time in coordination with the vacuuming process. By means of the coordinated operation of the pump and the ultraviolet lamp, the lifespan of the ultraviolet lamp is increased and the food storing quality is improved.

The model embodiments relating to a refrigerator realized in order to attain the aim of the present invention are illustrated in the attached figures, where:

FIG. 1—is the perspective view of a refrigerator.

Figure 2:
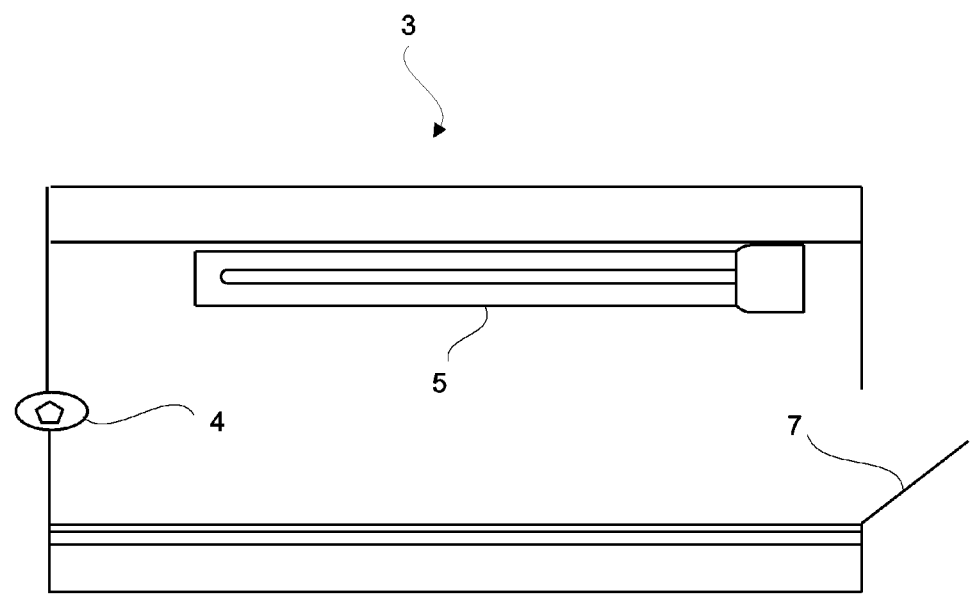

FIG. 2—is the perspective view of the vacuum compartment.

The elements illustrated in the figures are numbered as follows:
1. Refrigerator
2. Fresh food compartment
3. Vacuum compartment
4. Pump
5. Ultraviolet lamp
6. Control unit
7. Lid The following symbols are used for explicating the refrigerator (1) of the present invention:
$t_s$: The sterilization time predetermined by the producer
$t_p$: The pump operation time predetermined by the producer
$t_{palt}$: The predetermined pump operation time lower value
$t_{süst}$: The predetermined sterilization upper value The refrigerator (1) comprises at least one fresh food compartment (2) wherein foodstuffs to be cooled are placed, a vacuum compartment (3) situated in the fresh food compartment (2), wherein foodstuffs are placed for being stored without spoiling, a pump (4) that enables the air inside the vacuum compartment (3) to be evacuated and at least one ultraviolet lamp (5) that is situated on the vacuum compartment (3) and that provides sterilization. The refrigerator (1) of the present invention comprises a control unit (6) that operates the pump (4) during a pump operation time ($t_p$) predetermined by the producer for each type of food and operates the ultraviolet lamp (5) during a sterilization time ($t_s$) predetermined by the producer, that is based on the pump operation time ($t_p$). By means of the coordinated operation of the pump (4) and the ultraviolet lamp (5), the vacuuming and sterilization processes are realized so as to provide optimum storage conditions.

In an embodiment of the present invention, the control unit (6) activates the ultraviolet lamp (5) while the pump (4) is not operated. The ultraviolet lamp (5) and the pump (4) are never operated simultaneously. The ultraviolet rays are prevented from being emitted in an irregular manner inside the vacuum compartment (3) due to the vacuuming process and thus the effectiveness of the sterilization process is improved.

In an embodiment of the present invention, the control unit (6) operates the ultraviolet lamp (5) for a predetermined sterilization time upper value ($t_{süst}$) if the pump operation time ($t_p$) is greater than a predetermined pump operation time lower value ($t_{palt}$). In cases wherein the oxygen concentration inside the vacuum compartment (3) is kept low, the ultraviolet intensity can be safely increased. Thus, for easily perishable foods such as fish, chicken, etc., the high vacuuming and intense ultraviolet sterilization processes are realized in a controlled manner.

In an embodiment of the present invention, the refrigerator (1) comprises at least one lid (7) disposed on the vacuum compartment (3) and that allows the foodstuffs to be placed into the vacuum compartment (3). When the lid (7) is opened and closed, the control unit (6) operates the ultraviolet lamp (5) for the predetermined sterilization time ($t_s$). By operating the ultraviolet lamp (5) before the pump (4), the microbiological load of the air that fills into the vacuum compartment (3) is reduced before the vacuuming process, the foods are prevented from being spoiled and the color and taste of the foods are prevented from changing.

In an embodiment of the present invention, the ultraviolet lamp (5) emits ultraviolet rays with wavelengths between 240 nm and 280 nm. Since the wavelength range between 240 nm and 280 nm is the ray range with the highest effect on microorganisms, the microbiological load of the foods is effectively reduced.

By means of the present invention, the ultraviolet lamp (5) that provides sterilization in the vacuum compartment (3) and the pump (4) are operated in a controlled manner. The ultraviolet radiation intensity is directly proportional with the radiation time and the radiation intensity in the fixed time period. While sterilization effectiveness decreases at low radiation intensity, oxidation and color change can occur in foods at high radiation intensity. By means of the interdependent pump operation ($t_p$) and the sterilization times ($t_s$) predetermined by the user or the producer, the ultraviolet radiation intensity and the pump operation time ($t_p$) are optimized and the ultraviolet lamp (5) is activated in a controlled manner. Thus, the growth of microorganism in foods such as red meat during the storing process is prevented and the color changes in this type of foods occurring due to exposition to ultraviolet rays for a long time and/or decrease in oxygen concentration in the environment due to the vacuuming process are avoided.

The invention claimed is:

1. A refrigerator (1) comprising at least one fresh food compartment (2) wherein foodstuffs to be cooled are placed, a vacuum compartment (3) situated in the fresh food compartment (2), wherein foodstuffs are placed for being stored without spoiling, a pump (4) that enables the air inside the vacuum compartment (3) to be evacuated and at least one ultraviolet lamp (5) that is situated on the vacuum compartment (3) and that provides sterilization, characterized by a control unit (6) that operates the pump (4) during a pump operation time ($t_p$) predetermined by the producer for each type of food and operates the ultraviolet lamp (5), prior to operating the pump for the pump operation time ($t_p$), during a sterilization time ($t_s$) predetermined by the producer according to the pump operation time ($t_p$) and wherein the control unit never simultaneously operates ultraviolet lamp and the pump.

2. A refrigerator (1) as in claim 1, characterized by the control unit (6) that operates the ultraviolet lamp (5) for a predetermined sterilization time upper value ($t_{süst}$) if the pump operation time ($t_p$) is greater than a predetermined pump operation time lower value ($t_{palt}$).

3. A refrigerator (1) as in claim 1, comprising at least one lid (7) disposed on the vacuum compartment (3) and that allows the foodstuffs to be placed into the vacuum compartment (3), characterized by the control unit (6) that activates the ultraviolet lamp (5) for the predetermined sterilization time ($t_s$) when the lid (7) is opened and closed.

4. A refrigerator (1) as in claim 1, characterized by the ultraviolet lamp (5) that emits ultraviolet rays at the wavelengths between 240 nm and 280 nm.

5. A refrigerator (1) as in claim 2, comprising at least one lid (7) disposed on the vacuum compartment (3) and that allows the foodstuffs to be placed into the vacuum compartment (3), characterized by the control unit (6) that activates the ultraviolet lamp (5) for the predetermined sterilization time ($t_s$) when the lid (7) is opened and closed.

6. A refrigerator (1) as in claim 2, characterized by the ultraviolet lamp (5) that emits ultraviolet rays at the wavelengths between 240 nm and 280 nm.

7. A refrigerator (1) as in claim 3, characterized by the ultraviolet lamp (5) that emits ultraviolet rays at the wavelengths between 240 nm and 280 nm.

8. A refrigerator (1) as in claim 5, characterized by the ultraviolet lamp (5) that emits ultraviolet rays at the wavelengths between 240 nm and 280 nm.

9. A refrigerator (1) comprising at least one fresh food compartment (2) wherein foodstuffs to be cooled are placed, a vacuum compartment (3) situated in the fresh food compartment (2), wherein foodstuffs are placed for being stored without spoiling, a pump (4) that enables the air inside the vacuum compartment (3) to be evacuated and at least one ultraviolet lamp (5) that is situated on the vacuum compartment (3) and that provides sterilization, characterized by a control unit (6) that:

operates the ultraviolet lamp (5) during a sterilization time ($t_s$), upon completion of the sterilization time ($t_s$), operates the pump (4) during a pump operation time ($t_p$) predetermined by the producer for each type of food such that the control unit (6) activates the ultraviolet lamp (5) while the pump (4) is not operated, wherein the sterilization time ($t_s$) is predetermined by the producer according to the pump operation time ($t_p$).

10. A refrigerator (9) as in claim 2, characterized by the control unit (6) that operates the ultraviolet lamp (5) for a predetermined sterilization time upper value ($t_{süst}$) if the pump operation time ($t_p$) is greater than a predetermined pump operation time lower value ($t_{palt}$).

11. A refrigerator (1) as in claim 9, comprising at least one lid (7) disposed on the vacuum compartment (3) and that allows the foodstuffs to be placed into the vacuum compartment (3), characterized by the control unit (6) that activates the ultraviolet lamp (5) for the predetermined sterilization time ($t_s$) when the lid (7) is opened and closed.

12. A refrigerator (1) as in claim 9, characterized by the ultraviolet lamp (5) that emits ultraviolet rays at the wavelengths between 240 nm and 280 nm.

13. A refrigerator (1) as in claim 10, comprising at least one lid (7) disposed on the vacuum compartment (3) and that allows the foodstuffs to be placed into the vacuum compartment (3), characterized by the control unit (6) that activates the ultraviolet lamp (5) for the predetermined sterilization time ($t_s$) when the lid (7) is opened and closed.

14. A refrigerator (1) as in claim 10, characterized by the ultraviolet lamp (5) that emits ultraviolet rays at the wavelengths between 240 nm and 280 nm.

15. A refrigerator (1) as in claim 11, characterized by the ultraviolet lamp (5) that emits ultraviolet rays at the wavelengths between 240 nm and 280 nm.

16. A refrigerator (1) as in claim 13, characterized by the ultraviolet lamp (5) that emits ultraviolet rays at the wavelengths between 240 nm and 280 nm.

* * * * *